United States Patent [19]

Gresh

[11] Patent Number: 5,314,066
[45] Date of Patent: May 24, 1994

[54] DISPLAY AND STORAGE PACKAGE

[75] Inventor: Timothy F. Gresh, Canton, Conn.

[73] Assignee: Eastman Kodak Company, Rochester, N.Y.

[21] Appl. No.: 3,335

[22] Filed: Jan. 12, 1993

[51] Int. Cl.⁵ .................................. B65D 85/671
[52] U.S. Cl. ................................ 206/389; 206/455
[58] Field of Search ............... 40/124, 124.1, 124.2, 40/124.4, 152, 152.1, 154, 156, 157, 158.1, 159, 159.2; 206/0.8, 0.81–0.84, 45.34, 216, 223, 225, 232, 333, 387, 389, 391, 409, 425, 444, 449, 450, 454–456, 457, 459.5, 559–565, 581, 461–483, 806, 820; 242/71, 71.1, 71.7; 281/21, 22, 26, 28, 31, 51; 434/429; 383/37–40

[56] References Cited

U.S. PATENT DOCUMENTS

| | | | |
|---|---|---|---|
| 2,754,867 | 7/1956 | Langer | 383/39 |
| 3,555,713 | 1/1971 | Leinbach | 40/159 |
| 4,049,119 | 9/1977 | Wilson | 206/387 |
| 4,195,739 | 4/1980 | Sweet, III | 206/391 |
| 4,421,231 | 12/1983 | McCarn | 206/388 |
| 4,629,070 | 12/1986 | Roberg | 383/38 |
| 4,696,403 | 9/1987 | Hoover | 383/38 |
| 4,715,499 | 12/1987 | Franklin | 383/39 |
| 4,802,585 | 2/1989 | Durrer et al. | 383/38 |
| 4,863,285 | 9/1989 | Claxton | 383/37 |
| 4,887,715 | 12/1989 | Spahn et al. | 383/39 |
| 4,934,532 | 6/1990 | Costa | 206/455 |
| 4,957,205 | 9/1990 | Rose, Jr. | 206/444 |
| 4,972,952 | 11/1990 | Reiseneder | 206/456 |
| 5,031,773 | 7/1991 | Manico et al. | 206/455 |

FOREIGN PATENT DOCUMENTS

| | | | |
|---|---|---|---|
| 0728069 | 4/1955 | United Kingdom | 383/38 |
| 2081215 | 2/1982 | United Kingdom | 383/38 |

Primary Examiner—Jimmy G. Foster
Attorney, Agent, or Firm—Roger A. Fields

[57] ABSTRACT

A display and storage package is disclosed for a film cassette containing a rolled filmstrip having a series of successively recorded images and for an index print having rows of small-size positive images that match the recorded images. The package includes a normally flat pocket for the film cassette defined by opposite portions of a pair of superimposed flexible sheets, the opposite portions being joined to each other along side edges of the pocket spaced apart sufficiently to permit the opposite portions to be arched away from each other to expand the pocket for receiving the cassette by pushing inwardly against side edges of the sheets located outwardly of the side edges of the pocket. An envelope for the index print is defined by opposite portions of the sheets adjacent the opposite portions of the sheets that define the pocket.

2 Claims, 2 Drawing Sheets

DISPLAY AND STORAGE PACKAGE

CROSS-REFERENCE TO RELATED APPLICATIONS

Reference is made to commonly assigned copending applications Ser. No. 07/003,364, entitled CONTAINER FOR INDEX PRINT SHEET AND CASSETTE, and filed Jan. 12, 1993 in the name of R. J. Blackman, and Ser. No. 08/003,336, entitled CONTAINER FOR CASSETTE, PRINT STACK, AND INDEX PRINT, and filed Jan. 12, 1993 in the names of T. F. Gresh and W. H. Valls.

BACKGROUND OF THE INVENTION

1. Field of the Invention

The invention relates to a display and storage package for a film cassette housing a rolled filmstrip having a series of successively recorded images and for an index print having rows of small-size positive images that match the recorded images.

2. Description of the Prior Art

Generally, a processing laboratory gives the customer a processed photographic negative film and photographic picture prints which are copied and enlarged from the film. The negative film is usually cut into several sections, each one containing the same number of negatives and inserted in an open-ended sheath or sleeve. Many customers store the picture prints in an envelope (with the negatives), making it difficult to later find a particular print.

Index or contact print sheets have been proposed which make it easier to find a particular negative. An index print sheet has printed on it several parallel rows of small-size positive images that match the negatives. The positive images are numbered in accordance with numbering of the negatives.

A book-like container for the index print sheet, the negatives, and a stack of picture prints is disclosed in U.S. Pat. No. 4,966,285, issued Oct. 30, 1990. The container is rather bulky and has no provision for storing a film cassette. Alternatively, the patent discloses a book-like container for an index print sheet and a still video floppy disc cassette. The index print sheet is stored in an exterior pocket formed by a transparent sheet secured along three of its edges to the respective outsides of a cover and a base of the container. Moving the cover away from the base to open the container flexes the image portion of the index print sheet along a mid-line. This flexing can possibly damage the image portion. The cassette is stored in an interior pocket raised from the base. This arrangement makes the container rather bulky.

THE CROSS-REFERENCE APPLICATION

Cross-referenced application Ser. No. 08/003,364 discloses a container for a cassette which holds an image bearing medium having recorded images and for an index print which has printed pictures that match the plurality of images on the image bearing medium. The container comprises a transparent sheet-like cover having a length and width slightly larger than corresponding dimensions of the index print to closely overlay the index print, and a sheet-like back having a length and width similar to the length and width of the cover to store the index print snugly between the cover and the back with the plurality of pictures on the index print visible through the cover. The back includes an integrally formed nest blown outward to hold the cassette out of the way of the index print sheet.

Cross-referenced application Ser. No. 09/003,336 discloses a container for a cassette housing an image bearing medium having recorded images, for a stack of photographic picture prints made from the recorded images, and for an index print having rows of small-size positive images that match the recorded images. The container comprises a book-like jacket including a pair of leaves separated by a spine joined to the leaves at respective fold lines to permit the leaves to be arranged opposing each other. At least one of the leaves is photographic paper to permit the index print to be formed directly on that leave. The spine is wide enough to permit the stack of photographic picture prints to be stored between the leaves when the leaves oppose each other. An openable pocket joined to the leaves across the spine is opened to receive the cassette when the leaves oppose each other. A storage sheath with a window for viewing the index print is adapted to receive the jacket with its leaves opposing each other.

SUMMARY OF THE INVENTION

A display and storage package for a film cassette containing a rolled filmstrip having a series of successively recorded images and for an index print having rows of small-size positive images that match the recorded images, comprises:

a normally flat pocket for the film cassette defined by respective opposite portions of a pair of superimposed flexible sheets, the opposite portions being joined to each other along side edges of the pocket spaced apart to provide a width of the pocket when flat which is sufficiently greater than the width of the cassette to permit the opposite portions to be arched away from each other to expand the pocket to a diameter for receiving the cassette by pushing inwardly against side edges of the sheets located outwardly of the side edges of the pocket; and an envelope for the index print defined by respective opposite portions of the sheets which are different than the opposite portions of the sheets that define the pocket.

DETAILED DESCRIPTION OF THE PREFERRED EMBODIMENT

Figure 1:
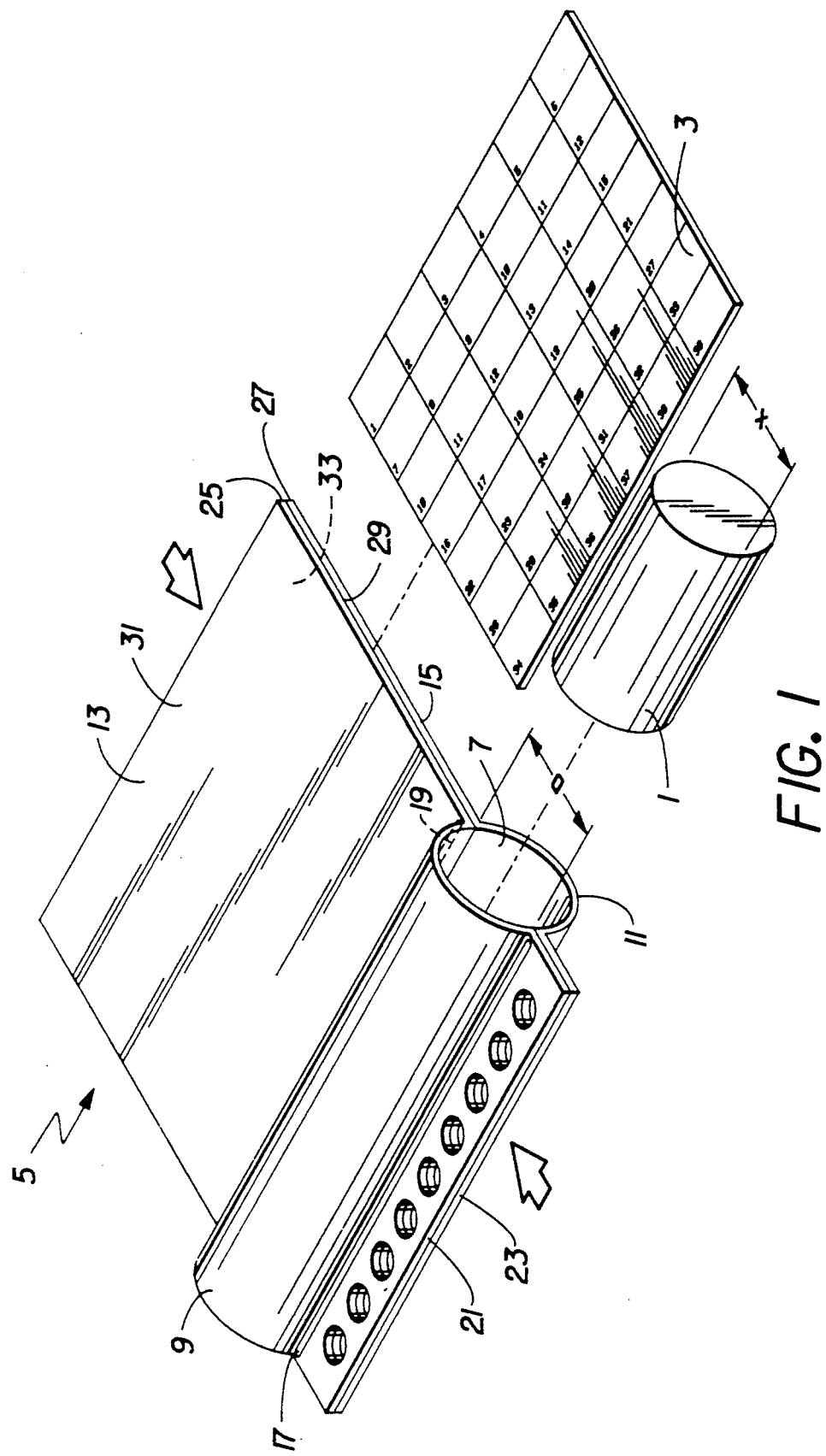
FIG. 1 is a perspective view of a display and storage package according to a preferred embodiment of the invention, showing how a film cassette and an index print are inserted into the package by pushing inwardly at side edges of the sheets.

Referring to FIG. 1, a 35 mm film cassette 1 is shown similar to the one disclosed in commonly assigned copending application Ser. No. 07/793,980 entitled FILM CASSETTE HAVING SPOOL CORE WITH FASTENING HOOK and filed Nov. 18, 1991 in the names of D. R. Zander and C. M. Csaszar. The cassette 1 houses a rolled filmstrip, not shown, having a series of successively numbered conventional negatives.

An index print 3 is shown in FIG. 1 similar to the one disclosed in U.S. Pat. No. 4,966,285, issued Oct. 30, 1990. The index print 3 has printed on it several parallel rows of small-size positive images that match the negatives inside the cassette 1. The positive images are numbered in accordance with numbering of the negatives.

Figure 2:
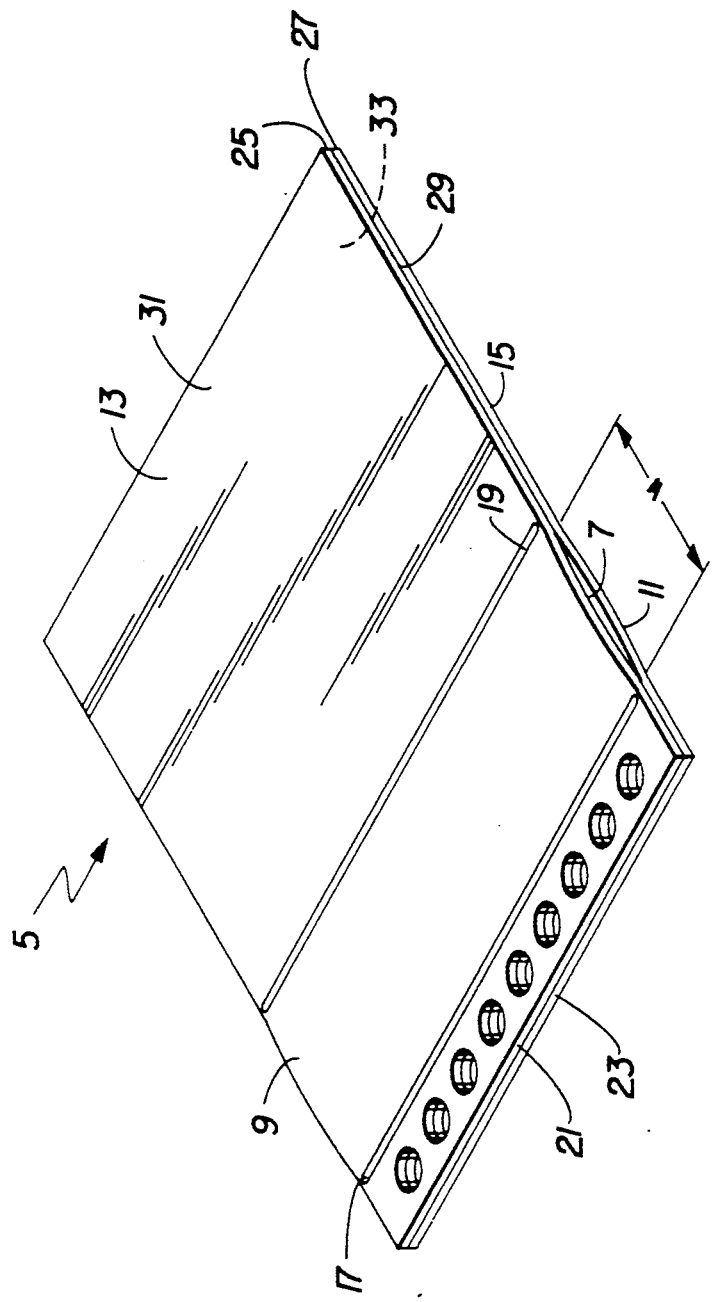
FIG. 2 is a perspective view of the package in its original condition prior to receiving the film cassette and the index print.

A display and storage package 5 includes a normally flat open-ended pocket 7 for the film cassette 1 defined by respective opposite portions 9 and 11 of a pair of superimposed flexible transparent sheets 13 and 15. See FIGS. 1 and 2. The opposite portions 9 and 11 of the flexible sheets 13 and 15 that define the pocket 7 are joined to each other along a pair of parallel side edges 17 and 19 of the pocket. The two side edges 17 and 19 of the pocket 7 are spaced apart to provide a width W of the pocket when flat, as in FIG. 2, which is sufficiently greater than the width X of the film cassette 1 to permit the opposite portions 9 and 11 to be arched away from each other, as in FIG. 1, to expand or open the pocket to a diameter D (less than the width W) for receiving the cassette by pushing inwardly against respective pairs of parallel side edges 21, 23 and 25, 27 of the flexible sheets 13 and 15. An envelope 29 for the index print 3 is defined by respective opposite portions 31 and 33 of the sheets 13 and 15 which are adjacent the opposite portions 9 and 11.

The invention has been described with reference to a preferred embodiment. However, it will be appreciated that variations and modifications can be effected within the ordinary skill in the art without departing from the scope of the invention.

We claim:

1. A combination of a film cassette containing a rolled filmstrip having a series of successively recorded images, an index print substantially larger than the film cassette and having rows of small-size positive images that match the recorded images, and a display and storage package, wherein said package comprises:

a normally flat pocket for the film cassette defined by respective opposite portions of a pair of superimposed flexible sheets, said opposite portions being joined to each other only along two parallel side edges of said pocket to leave opposite ends of the pocket open and being spaced apart to provide a width of the pocket when flat which is sufficiently greater than the width of the cassette to permit the opposite portions to be arched away from each other to expand the pocket to a diameter for receiving the cassette only through either one of said opposite ends by pushing inwardly against two parallel side edges of said sheets located outwardly of said side edges of the pocket to open both of the opposite ends; and an envelope for the index print defined by respective opposite portions of said sheets which are different than said opposite portions of the sheets that define said pocket and being substantially larger than the pocket.

2. A display and storage package as recited in claim 1, wherein at least one of said flexible sheets is transparent to view the cassette in said pocket and to view the index print in said envelope.

* * * * *